(12) United States Patent
Libera et al.

(10) Patent No.: US 11,358,260 B2
(45) Date of Patent: Jun. 14, 2022

(54) SHEAR WRENCH TOOL

(71) Applicant: BLACK & DECKER INC., New Britain, CT (US)

(72) Inventors: Philipp Libera, Idstein (DE); Rafael Gottschling, Idstein (DE); Michael Kunz, Idstein (DE); Tobias Heep, Idstein (DE)

(73) Assignee: BLACK & DECKER INC., New Britain, CT (US)

( * ) Notice: Subject to any disclaimer, the term of this patent is extended or adjusted under 35 U.S.C. 154(b) by 275 days.

(21) Appl. No.: 16/713,222

(22) Filed: Dec. 13, 2019

(65) Prior Publication Data

US 2021/0170551 A1 Jun. 10, 2021

(30) Foreign Application Priority Data

Dec. 6, 2019 (EP) .................................... 19214283

(51) Int. Cl.
*B25B 21/00* (2006.01)
*B23D 29/02* (2006.01)
*B25F 5/02* (2006.01)
*B25B 21/02* (2006.01)

(52) U.S. Cl.
CPC ............ *B25B 21/002* (2013.01); *B23D 29/02* (2013.01); *B25B 21/02* (2013.01); *B25F 5/02* (2013.01)

(58) Field of Classification Search
CPC ..... B25B 21/00; B25B 21/001; B25B 21/002; B25B 21/02; B23D 29/02; B25F 5/02
See application file for complete search history.

(56) References Cited

U.S. PATENT DOCUMENTS

| 4,565,112 A | 1/1986 | Fujita et al. |
| 5,953,965 A | 9/1999 | Kaneyama et al. |
| 10,099,353 B2 | 10/2018 | Nishimiya et al. |
| 2012/0014065 A1 | 1/2012 | Haga et al. |

(Continued)

FOREIGN PATENT DOCUMENTS

| JP | H0653066 U | 7/1994 |
| WO | 2010134431 A | 11/2010 |
| WO | 2018160230 A | 9/2018 |

OTHER PUBLICATIONS

European Search Report dated Jun. 26, 2020 from corresponding EP Application No. 19424283.4.
European Search Report dated Aug. 11, 2020.

*Primary Examiner* — David B. Thomas
(74) *Attorney, Agent, or Firm* — Kofi A. Schulterbrandt

(57) ABSTRACT

A shear wrench tool including an electric motor, an output section having first and second output sleeves and a transmission for transferring torque from the motor to the output section wherein in use the output sleeves are caused to be rotated in opposite directions relative to each another, the first output sleeve configured for mating with a nut and the second output sleeve configured for mating with a tip of a bolt to be sheared; the shear wrench tool further comprising an ejection mechanism having a first impact part which is both rotationally and axially movable and which has a first active surface, a second impact part which is rotationally restricted but axially movable and which has a second active surface, the ejection mechanism also having biasing means for urging the first active surface into engagement with the second active surface.

11 Claims, 7 Drawing Sheets

(56) References Cited

U.S. PATENT DOCUMENTS

2017/0043457 A1    2/2017   Tsuge
2017/0157752 A1    6/2017   Nishimiya et al.
2020/0139519 A1*   5/2020   Banba .................... B25B 21/00

* cited by examiner

SHEAR WRENCH TOOL

CROSS-REFERENCE TO RELATED APPLICATIONS

This application claims priority from EP Patent Application No. EP19214283.4, filed Dec. 6, 2019 the disclosures of which is incorporated herein by reference in its entirety.

FIELD OF THE INVENTION

This specification concerns shear wrench tools.

BACKGROUND OF THE INVENTION

Shear wrench tools are known such as described in US2017/043457A1 and U.S. Pat. No. 5,953,965. Such tools shear a tip of a bolt when the bolt is fastened to a predetermined tightness. The sheared tip must somehow be removed from the tool prior to tightening another bolt. Also, it is known for a handle to be provided at the rear of such tools which can cause user fatigue in use because to counter the moment of force pulling the tool forward (due to weight of the motor, transmission and output section etc.) a user must exert a counter moment with their wrist.

BRIEF SUMMARY OF THE INVENTION

According to an aspect of the present disclosure there is provided a shear wrench tool comprising an electric motor having a motor output shaft, a transmission having a plurality of planetary gear stages and an output section having first and second output sleeves the first output sleeve being configured for mating with a nut and the second output sleeve being configured for mating with a tip of a bolt to be sheared, wherein the electric motor is configured to provide torque via the transmission to the output section for causing the first and second output sleeves to be rotated in opposite directions relative to each other in use, and wherein the electric motor, the transmission and the output section are arranged in an axial sequence one after the other such that the first and second output sleeves circumferentially extend around the same axis that the motor output shaft and the planetary gear stages rotate about in use, thereby providing that the motor output shaft, the planetary gear stages and the first and second output sleeves are coaxial.

The shear wrench tool may have a handle located part way along the axial length of the tool between the motor and the output section such that a moment of force acting on the tool about the handle in a direction of the output section substantially balances a moment of force acting on the tool in the opposite direction.

A distal surface of the handle may be provided with a battery receiving portion.

The transmission may have at least five planetary gear stages provided in series.

According to another aspect of the present disclosure there is provided a shear wrench tool comprising: an electric motor, an output section having first and second output sleeves and a transmission for transferring torque from the motor to the output section wherein in use the output sleeves are caused to be rotated in opposite directions relative to each another, the first output sleeve configured for mating with a nut and the second output sleeve configured for mating with a tip of a bolt to be sheared; the shear wrench tool further comprising an ejection mechanism having a first impact part which is both rotationally and axially movable and which has a first active surface, a second impact part which is rotationally restricted but axially movable and which has a second active surface, the ejection mechanism also having biasing means for urging the first active surface into engagement with the second active surface, wherein in use the first impact part receives torque from the electric motor for causing the first impact part to rotate relative to the second impact part whereby during such rotation interaction between the first and second active surfaces causes the first impact part to disengage from the second impact part against force of the biasing means whereby the biasing means subsequently urges the first impact part back into engagement with the second impact part for generating an impulse which is transferred via the second impact part to a sheared bolt tip for urging the sheared bolt tip out of the second output sleeve.

The first and second active surfaces may each define at least one ramp section.

At least one of the first and second active surfaces may comprise an undulating surface.

The first active surface may comprise a circumferentially extending undulating surface and the second active surface may also comprise a circumferentially extending undulating surface.

At least one of the first and second active surfaces may comprise a multi-ramp surface.

At least one of the first and second active surfaces may comprise a toothed like, optionally a zig-zag like, surface.

At least one of the first and second active surfaces may comprise a circumferentially extending slope.

The biasing means may comprise a spring.

The transmission may comprise a plurality of planetary gear stages and the first impact part may be arranged to receive torque from a feature of a said planetary gear stage.

The first impact part may be arranged to receive torque from a feature acting as a sun gear of a said planetary gear stage.

Ribs on the first impact part may mesh with ribs on an internal surface of said feature acting as a sun gear.

According to another aspect of the present disclosure there is provided a sleeve assembly for a shear wrench tool comprising: an output sleeve configured to mate with a nut to facilitate winding of the nut onto a threaded bolt and having a plurality of circumferentially arranged locking features for interlocking with those of a transmission sleeve; a transmission sleeve for transferring torque between the output sleeve and at least one feature of a shear wrench tool transmission section the transmission sleeve having a first set of circumferentially arranged locking features for interlocking with the locking features of the output sleeve and a second set of circumferentially arranged locking features for cooperating with a locking sleeve; a locking sleeve coupled to the output sleeve in a manner which permits the locking sleeve to rotate between first and second rotational positions relative to the output sleeve, the locking sleeve having circumferentially arranged locking features which cooperate with the second set of circumferentially arranged locking features of the transmission sleeve upon rotating the locking sleeve between the first and second rotational positions when the locking features of the output sleeve and the first set of locking features of the transmission sleeve are interlocked whereby axial movement between the output sleeve and the transmission sleeve is restricted.

The locking features of the output sleeve and the first set of locking features of the transmission sleeve may be projections that are configured to be interlocked with each other.

Grooves between the projections of the output sleeve may be configured to receive the projections comprising the first set of locking features of the transmission sleeve when such projections are interlocked.

The second set of locking features of the transmission sleeve may be provided on the first set of locking features of the transmission sleeve.

Each locking feature of the second set of locking features on the transmission sleeve may extend from a respective locking feature of the first set of locking features on the transmission sleeve.

A blocking feature, for instance a circlip, may be coupled to the output sleeve for preventing axial separation of the output sleeve from the locking sleeve.

A first part of a two-part retention mechanism may be provided on the output sleeve and is biased against the locking sleeve, wherein the locking sleeve may be provided with the second part of the two-part retention mechanism for cooperating with the first said part thereof at a predetermined rotational position of the locking sleeve relative to the output sleeve.

The first part of the two-part retention mechanism may be at least partially spherical and is biased towards the locking sleeve, wherein the second part of the two-part retention mechanism may be a depression for receiving the first part of the retention mechanism at the predetermined rotational position of the locking sleeve relative to the output sleeve.

According to another aspect of the present disclosure there is provided a shear wrench tool comprising a sleeve assembly as heretofore described.

According to another aspect of the present disclosure there is provided an arrangement comprising an output sleeve and a locking sleeve of the kind heretofore mentioned.

BRIEF DESCRIPTION OF THE DRAWINGS

Various aspects and embodiments of the invention will now be described by way of non-limiting example with reference to the accompanying drawings, in which.

DETAILED DESCRIPTION OF THE PREFERRED EMBODIMENT

Figure 1:
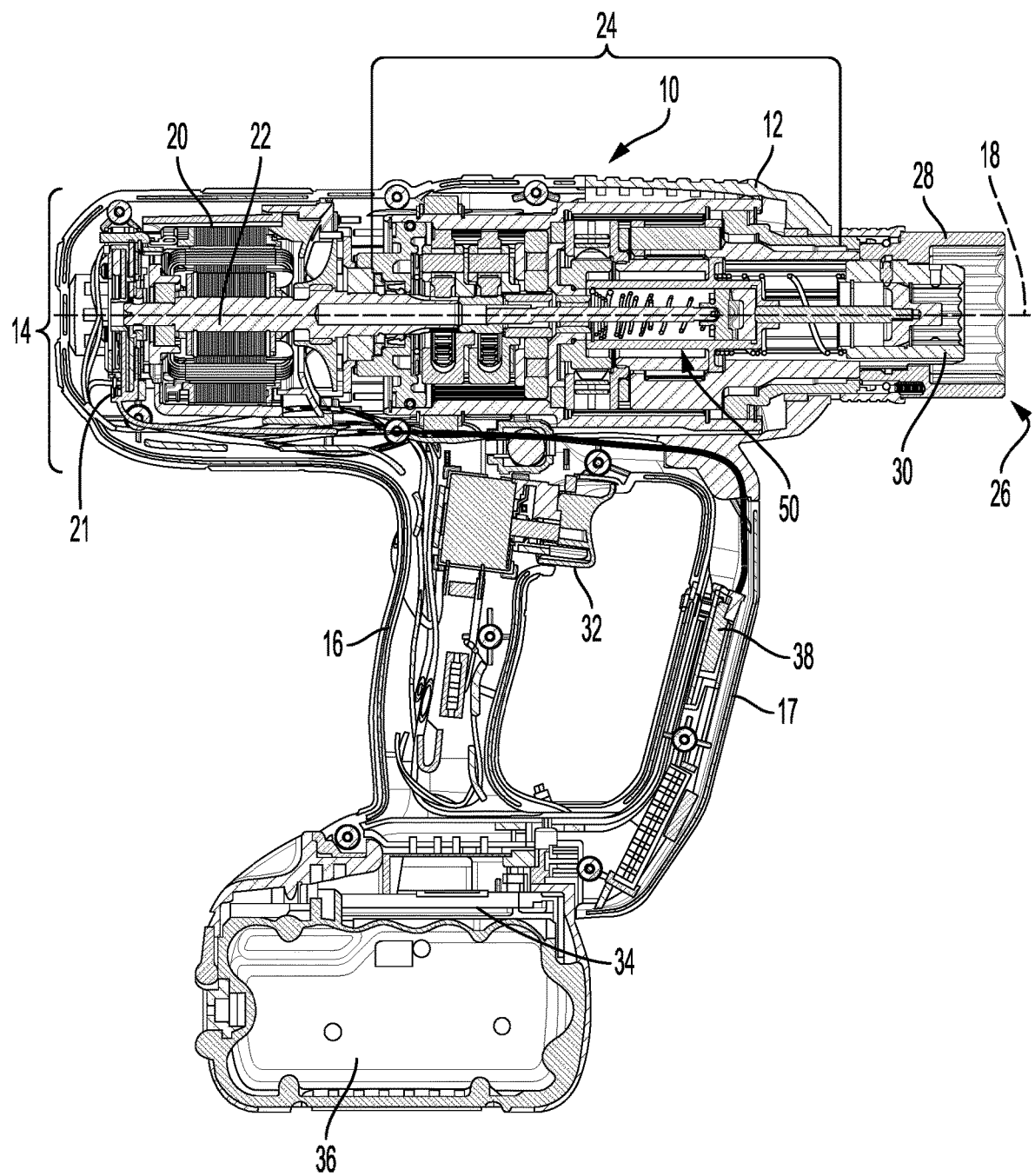
FIG. 1 is a cross-sectional view of a shear wrench tool.

FIG. 1 shows a shear wrench tool 10 with a housing 12, the housing having a drive section 14, a handle section 16 and a supplementary section 17. The drive section 14 extends along an axis 18 and contains an electric motor 20 having a motor output shaft 22, a transmission 24 having a plurality of planetary gear stages and an output section 26 having first and second output sleeves 28, 30 the first output sleeve 28 being configured for mating with a nut and the second output sleeve 30 being configured for mating with a tip of a bolt to be sheared. In use the electric motor 20 provides torque via the transmission 24 to the output section 26 for causing the first and second output sleeves 28, 30 to be rotated in opposite directions relative to each other.

The handle section 16 of the housing 12 is located part-way along the axial length of the drive section 14 of the housing 12. The handle section 16 is the section of the shear wrench tool 10 that a user grips with their hand in use. In particular the handle section 16 of the housing 12 is located at a centre of gravity of the shear wrench tool 10. In other words, looking at FIG. 1, clockwise moments of force about the handle (pulling the tool forwards in a user's hand) are substantially balanced by anti-clockwise moments of force about the handle (pulling the tool backwards in a user's hand). This reduces fatigue of a user's wrist in use, which is important because shear wrench tools 10 are typically heavy.

A trigger mechanism 32 is provided within the handle section 16 of the housing 12 so that a user can easily actuate the trigger mechanism 32 for activating the tool when gripping the handle section 16. A lower side of the handle section 16 of the housing 12 distal from the drive section 14 thereof is provided with a battery receiving portion 34. A battery 36 can thus cooperate with the battery receiving portion 34 for providing electrical power to features of the shear wrench tool 10. The battery receiving portion 34 is provided at the base of the handle section 16 of the housing 12 in order to minimise unbalance of moments of force about the handle as heretofore described whether or not a battery 36 is coupled to the shear wrench tool 10; meaning that the tool 10 feels balanced in a user's hand whether or not a battery 36 is attached to the battery receiving portion 34.

The supplementary section 17 of the housing 12 is located in front of the handle section 16, wherein it extends between the base of the handle section 16 of the housing 12 and the underside of the drive section 14 of the housing 12. The supplementary section 17 of the housing 12 contains features that might not otherwise fit inside other parts of the housing 12, such as a wireless communication device 38 for transmitting and receiving wireless information via one or more wireless communication protocols such as Bluetooth.

In some embodiments the supplementary section 17 of the housing 12 can be omitted, wherein electronic features that would otherwise have been located inside the supplementary section 17 (such as a wireless communication device 38) are instead located inside another part of the housing 12 which may need to be adapted to accommodate such extra feature (s), for example the handle section 16 of the housing 12 may be longer, which has the advantage of maintaining an ergonomic shape to enable comfortable gripping by a user but the added length accommodates the extra feature(s). Omission of the supplementary section 17 however would require modification of the mass distribution of the tool relative to the handle section 16 of the housing 12 in order for clockwise moments of force about the handle (pulling the tool forwards in a user's hand) to be balanced by anti-clockwise moments of force about the handle (pulling the tool backwards in a user's hand) and thus for the shear wrench tool 10 to feel balanced in a user's hand in use. The distribution of mass relative to the handle section 16 of the housing 12 can be modified by forming the handle section 16 in a different location along the axis 18 of the drive section 14. In other words, the handle can be placed anywhere along axis 18 to find the tool's centre of gravity to reduce fatigue for the user.

Figure 2:
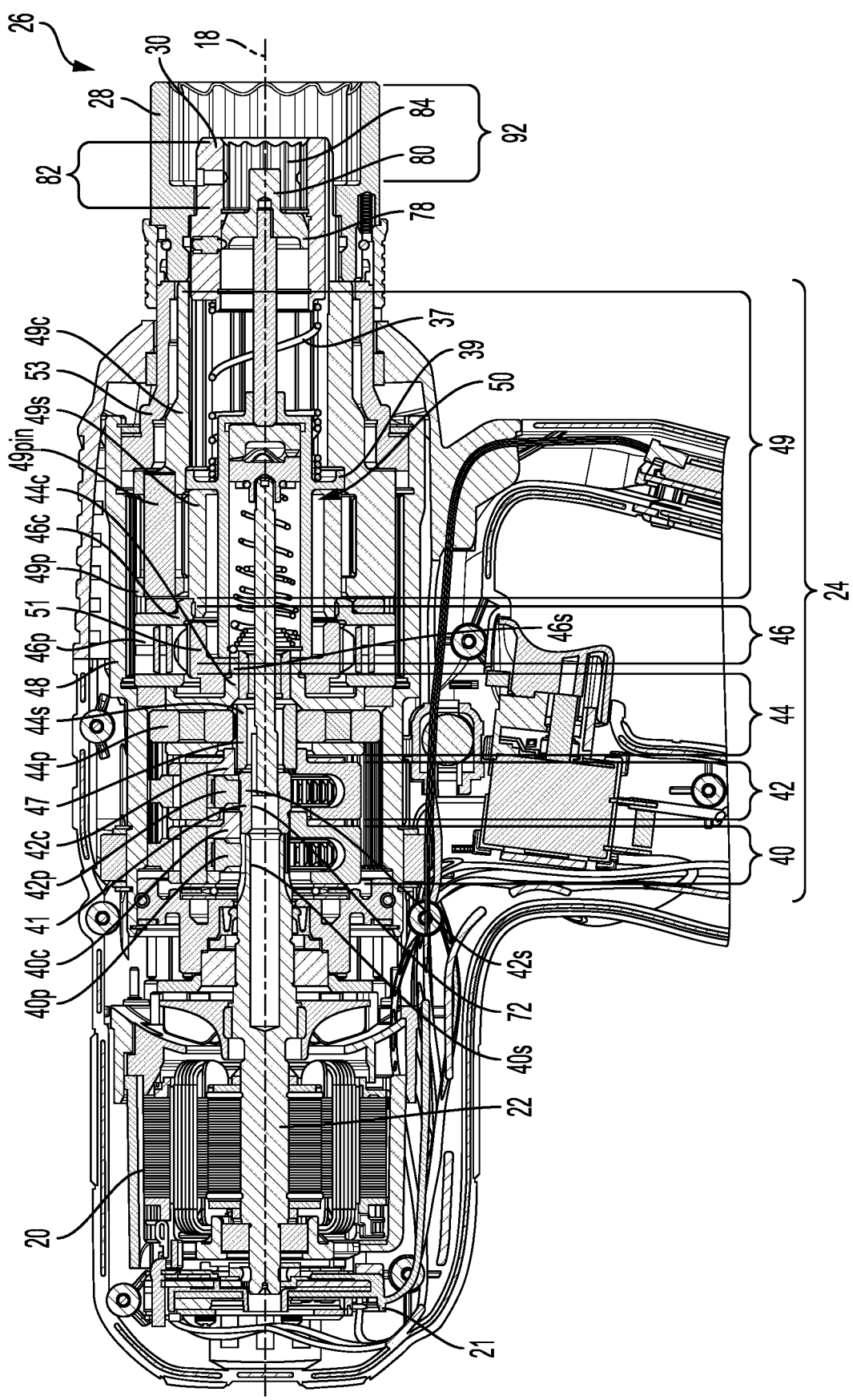
FIG. 2 is an enlarged view of part of FIG. 1.

Turing now to FIG. 2, the electric motor 20 is located at a rear end of the drive section 14 of the housing 12. The electric motor 20 is a brushless motor wherein control circuitry 21 thereof faces the rear inner surface of the drive section 14 of the housing 12. Suitable ventilation is provided e.g. one or more air vents through the rear end of the drive section 14 of the housing 12 for cooling the motor control circuitry 21. In use, when a user actuates the aforementioned switch mechanism 32 the motor 20 (and control circuitry 21 thereof) draw electrical power from the battery 36 for rotating the motor output shaft 22 which inputs torque to the transmission 24.

The transmission 24 has five planetary gear stages 40, 42, 44, 46, 49 in series between the motor output shaft 22 and the output section 26 of the shear wrench tool 10. This provides that rotational speed is reduced, whereas torque is stepped up, as rotational force flows through the transmission to the output section 26 of the tool 10.

A toothed distal end of the motor output shaft 22 acts as a sun gear $40_S$ of the first planetary gear stage 40. Torque is transferred from the sun gear $40_S$ to planet gears $40_P$ of the first planetary gear stage 40 and thereby via pins to a planet carrier $40_C$ of the first planetary gear stage 40. The planet gears $40_P$ mesh with a common ring gear 48 which is not rotationally fixed (and so can rotate) and is common to all of the first to fifth planetary gear stages 40, 42, 44, 46, 49.

An internal surface of the planet carrier $40_C$ of the first planetary gear stage 40 meshes with a sleeve 41, whereby the sleeve 41 acts as a sun gear $42_S$ of the second planetary gear stage 42. Torque is transferred from the sun gear $42_S$ to planet gears $42_P$ of the second planetary gear stage 42 and thereby via pins to a planet carrier $42_C$ of the second planetary gear stage 42. The planet gears $42_P$ mesh with the aforementioned common ring gear 48 which is not rotationally fixed and is common to all of the first to fifth planetary gear stages 40, 42, 44, 46, 49.

An internal surface of the planet carrier $42_C$ of the second planetary gear stage 42 meshes with an external surface of a sleeve 47, whereby the sleeve 47 acts as a sun gear $44_S$ of the third planetary gear stage 44. Torque is transferred from the sun gear $44_S$ to planet gears $44_P$ of the third planetary gear stage 44 and thereby via pins to a planet carrier $44_C$ of the third planetary gear stage 44. The planet gears $44_P$ mesh with the common ring gear 48 which is not rotationally fixed (and so can rotate) and is common to all of the first to fifth planetary gear stages 40, 42, 44, 46,49.

The planet carrier $44_C$ has teeth around its outer surface which mesh with teeth provided on an internal surface of a sleeve 51, whereby the sleeve 51 has outer teeth too and acts as a sun gear of the fourth planetary gear stage 46. Torque is transferred from the planet carrier $44_C$, via the sleeve 51, to planet gears $46_P$ of the fourth planetary gear stage 46 and thereby through pins to a planet carrier $46_C$ of the fourth planetary gear stage 46. The planet gears $46_P$ mesh with the aforementioned common ring gear 48 which is not rotationally fixed (and so can rotate) and is common to all of the first to fifth planetary gear stages 40, 42, 44, 46,49.

The planet carrier $46_C$ of the fourth planetary gear stage 46 is rotationally fixed to a sleeve which acts as the sun gear $49_S$ of the fifth planetary gear stage 49. The sun gear $49_S$ meshes with and thus transfers torque to planet gears $49_P$ of the fifth planetary gear stage 49, whereby torque is subsequently transferred through pins $49_{PIN}$ to a planet carrier $49_C$ of the fifth planetary gear stage 49. It will be noticed in FIG. 2 that the length of the fifth planetary gear stage 49 is long, wherein this is to account for the high torque values present in the transmission 24 at this stage. Persons skilled in the art will be familiar with the technique of varying the sizes of transmission components (like length and thickness) to accommodate required torque magnitudes and so will be able to adapt a particular transmission to accommodate specific magnitudes of torque without further explanation.

The planet carrier $49_C$ of the fifth planetary gear stage 49 is rotationally fixed to the second output sleeve 30 of the shear wrench tool, which is configured for mating with a tip of a bolt to be sheared. The first output sleeve 28 of the shear wrench tool is rotationally fixed relative to the common ring gear 48 via a sleeve 53.

Figure 5:
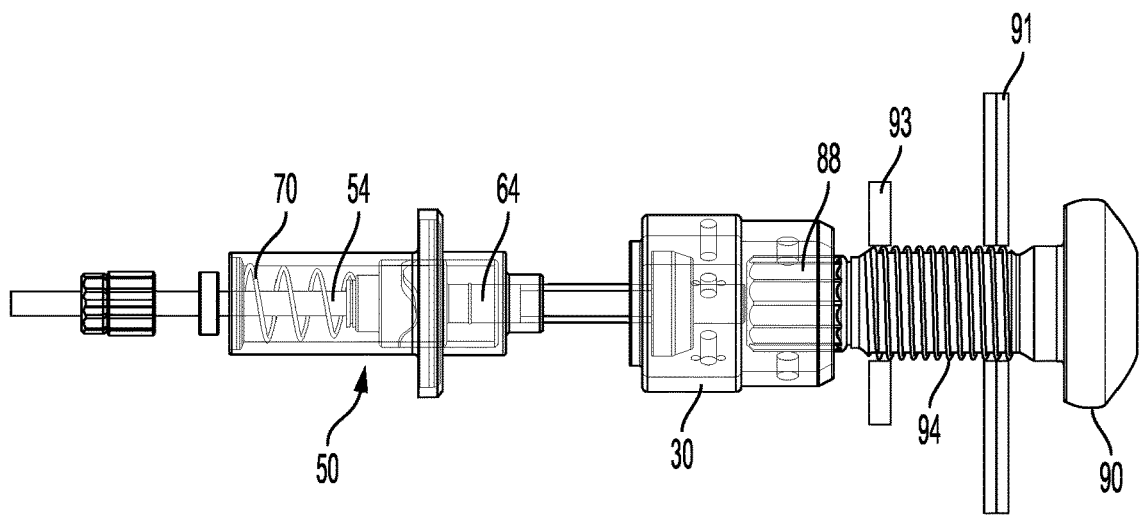

In view of the disclosure so far, it will be understood that activation of the electric motor 20 drives rotation of the second output sleeve 30 for turning a bolt and nut relative to each other. When a tip of a bolt to be sheared mates with the second output sleeve 30 and a nut mates with the first output sleeve 28 (described in more detail in connection with FIG. 5) causing the second output sleeve 30 to rotate winds the nut onto the (externally threaded) bolt due to relative rotation of the nut and bolt. During such tightening operation torque is transferred from the nut, via the first output sleeve 28 and sleeve 53, to the common ring gear 48 which completes the torque transfer cycle. In view of this understanding persons skilled in the art will grasp how using the motor 20 to drive rotation of the second output sleeve 30 causes relative rotation of the aforementioned nut and bolt up to a predetermined threshold fastening tightness at which point the tip of the bolt will shear from the body of the bolt.

The first output sleeve 28 can be removed and replaced with a different size version of the first output sleeve 28 in a manner that will be described later in order to accommodate different sized nuts.

It is here noted that in the shear wrench tool 10 described so far the electric motor 20, the transmission 24 and the output section 26 are arranged in an axial sequence one after the other such that in use the first and second output sleeves 28, 30 are rotated relative to each other about the same axis 18 that the motor output shaft 22 and the planetary gear stages rotate about in use, thereby providing that the motor output shaft 22, the planetary gear stages 40, 42, 44, 46, 49 and the first and second output sleeves 28, 30 are coaxial.

The shear wrench tool 10 has an ejection mechanism 50 for ejecting the aforementioned sheared tip in order to ready the tool for tightening another bolt. Details of the ejection mechanism 50 will now be described with reference to FIG. 3.

The ejection mechanism 50 has a cylinder 52 which extends along the axis 18 of the drive section 14. A first impact part 54 has a rod part 56 and a first active surface part 58, wherein the rod part 56 extends into the space defined by the cylinder 52 through a first cylinder opening 60 and wherein the first active surface part 58 is fixed to the end of the rod part 56 inside the cylinder 52. Similarly a second impact part 62 has a rod part 64 and a second active surface part 66, wherein the rod part 64 extends into the space defined by the cylinder 52 through a second cylinder opening 68 and wherein the second active surface part 66 is fixed to the end of the rod part 64 inside the cylinder 52. A spring 70 is provided inside the cylinder 52 one end of which engages an inner surface of the cylinder 52 (or a circlip located in a circumferentially extending slot within the cylinder) and the other end of which engages the first active surface part 58 (or a circlip fixed to the rod part 56) for urging the first active surface part 58 into contact with the second active surface part 66. The spring 70 thus causes the second active surface part 66 to be pushed to the right in FIG. 3, into engagement with an inner end surface 73 of the cylinder 52.

The first cylinder opening 60 through which the rod part 56 of the first impact part 54 extends is shaped so as to allow the rod part 56 to rotate. However, the second cylinder opening 68 through which the rod part 64 of the second impact part 62 extends is shaped so as to restrict rotation of the rod part 64 (or in other words the rod part 64 and the second cylinder opening 68 cooperate to prevent rotation of the rod part 64). It will thus be appreciated that the rod part 56 of the first impact part 54 can move rotationally and axially relative to the cylinder 52 but the rod part 64 of the second impact part 62 can only move axially relative to the cylinder 52.

A plurality of axially extending ribs 71 are circumferentially arranged about the distal end of the rod part 56 of the first impact part 54. Such ribs 71 interlock with inwardly extending teeth 72 circumferentially arranged on the inner surface of the sleeve 41 between the first and second planetary gear stages 40, 42. The rod part 56 is thus rotationally driven by the sleeve 41 when the electric motor 20 is active, however, the rod part 56 is able to move axially relative to the sleeve 41 by sliding in the teeth 72.

As will be described in more detail below the rod part 56 can be moved translationally between a first configuration in which the ribs 71 interlock with the inwardly extending teeth 72 of the sleeve 41 and a second configuration (further to the left in FIG. 2) in which the ribs 71 do not interlock with the inwardly extending teeth 72 of the sleeve 41. In the first such configuration the ejection mechanism 50 is operated by actuation of the electric motor 20 but in the second configuration the ejection mechanism 50 is disabled.

It is here mentioned that, as has already been described, the planet carrier 49$_C$ of the fifth planetary gear stage 49 is rotationally fixed to the second output sleeve 30 of the shear wrench tool 10 however the output sleeve 30 can additionally slide translationally relative to the planet carrier 49$_C$. Protrusions extending from the second output sleeve 30 are received in channels of the planet carrier 49$_C$ (or vice versa) for enabling this. A spring 37 urges the second output sleeve 30 along the axis 18 away from the electric motor 20 wherein ends of the aforementioned channels of the planet carrier 49$_C$ prevent the second output sleeve 30 from being ejected from the tool 10. As can be seen from FIG. 2 one end of the spring 37 engages a rear side of the second output sleeve 30 (or a circlip coupled to the output sleeve 30) and the other end of the spring 37 engages a circumferential flange 39 of the ejection mechanism 50 (or a circlip coupled to the cylinder 52). The purpose of the features described in this paragraph will become more apparent later on but essentially, in use, when the shear wrench tool 10 receives a nut and bolt (as described in connection with FIG. 5), when a user presses the tool 10 against the nut and bolt the plunger 78 and second output sleeve 30 are moved inwards (to the left in FIG. 2) against the bias of the springs 70 and 37 which moves to rod part 56 to the aforementioned second configuration in which the ejection mechanism 50 is deactivated. The shear wrench tool 10 can then be driven to fasten the nut onto the bolt without activating the ejection mechanism. When a user removes the tool 10 from the work area and withdraws it from the fastened bolt the force acting on the spring 37 is released thus enabling it to push the output sleeve 30 into its initial position, whereby this causes the rod part 56 to move back to its first configuration in which the ribs 71 interlock with the inwardly extending teeth 72 of the sleeve 41 such that the ejection mechanism 50 can be activated for ejecting a sheared bolt tip which will be described in more detail below.

Returning to FIG. 3 the first active surface part 58 has a first circumferentially extending undulating surface profile 74. The second active surface part 66 has a second circumferentially extending undulating surface profile 76. Such undulating surface profiles are configured to interlock with each other when the spring 70 pushes the first active surface part 58 into engagement with the second active surface part 66. Each undulating surface profile can in some embodiments have three undulations, although this is not necessary and other embodiments could have fewer or more such undulations. When the rod part 56 of the first impact part 54 rotates, upon being rotationally driven by the sleeve 41, undulations of the first active surface part 58 ride up undulations of the second active surface part 66. The nature of the cooperating undulations is such that the first impact part 54 is essentially launched away from the second impact part 62 against bias of the spring 70. In other words, undulations of the first active surface part 58 ride up undulations of the second active surface part 66 with enough speed such that momentum causes the first impact part 54 to move away from the second impact part 62 when undulations of the first active surface part 58 reach the top of undulations of the second active surface part 66.

Subsequently the spring 70 dampens axial movement of the first impact part 54 and pushes it back into contact with the second impact part 62. When the first impact part 54 hits against the second impact part 62 this produces an impulse which is transferred to a distal end of the rod part 64 and to a sheared bolt tip. Continued rotation of the sleeve 41 will cause the same action to happen repeatedly until eventually the sheared bolt tip is ejected from the shear wrench tool 10.

Figure 3:
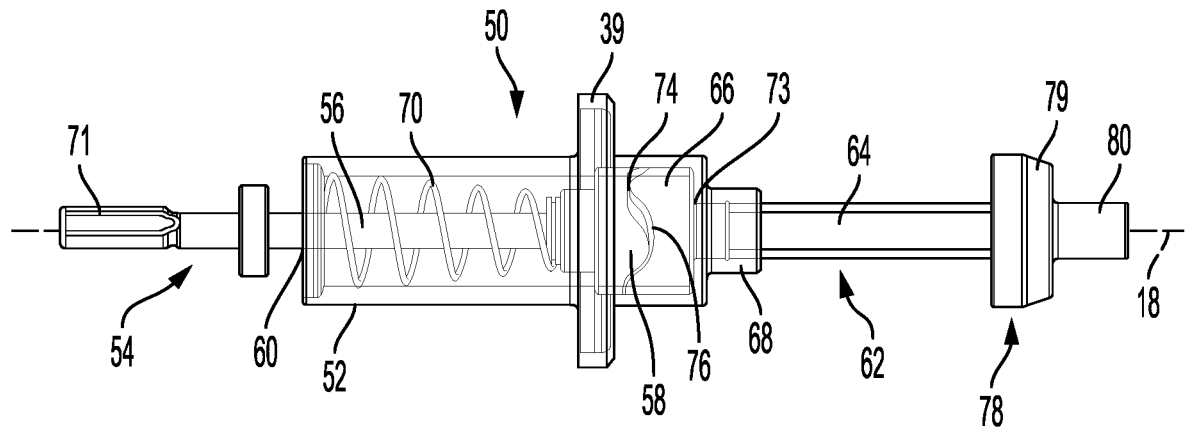
FIG. 3 is a side view of an ejection mechanism.
Figure 4:
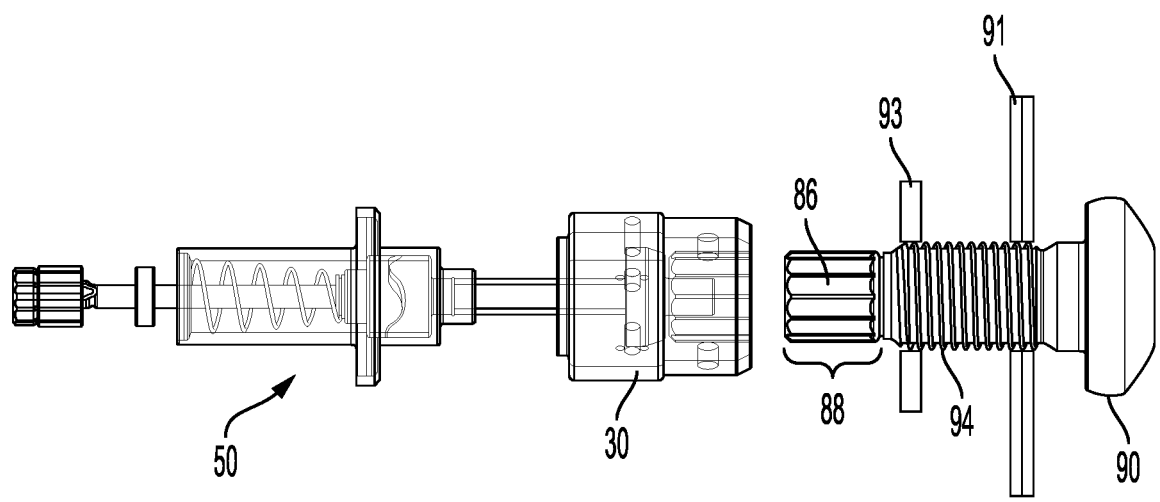
FIGS. 4 to 7 are side views of the ejection mechanism in FIG. 3 at various use stages.

Referring to FIGS. 2 to 4, a plunger 78 is fixed to a distal end of the rod 64 of the second impact part 62. The plunger 78 has a first body part 79 configured to slide against the inner surface of the second output sleeve 30 for blocking the ingress of debris into the shear wrench tool 10. The plunger 78 also has a finger 80 for extending into the space encompassed by an active part 82 of the second output sleeve 30. The active part 82 of the second output sleeve 30 is provided with circumferentially distributed axially extending ribs 84, wherein it is these ribs which interlock with axially extending ribs 86 provided on the tip 88 of a bolt 90.

With continued reference to FIGS. 2 to 4, an active part 92 of the first output sleeve 28 defines an inner profile for mating with and providing torque to a nut 93 to be wound onto the threaded section 94 of the bolt 90.

Use of the ejection mechanism 50 will now be explained, starting with FIG. 4 (where many features including the first output sleeve 28 are omitted for clarity purposes). As usual a bolt 90 extends through objects 91 to be coupled before a nut 93 is wound partially along the threaded section 94 of the bolt 90 by a user (usually a washer is also placed around the bolt 90 between the nut 93 and objects 91 to be coupled). The shear wrench tool 10 is then held so that the first and second output sleeves 28, 30 align with the bolt 90 to be sheared. In other words, the bolt 90 extends along the axis 18 of the drive section 14 and thus aligns with the output sleeves 28, 30. Next by moving the shear wrench tool 10 so that the output sleeves 28, 30 receive the bolt tip 88 and the nut 93, the tip 88 of the bolt 90 is caused to mate with the axially extending ribs 84 of the second output sleeve 30 as in FIG. 5 and the active part 92 of the first output sleeve 28 receives and mates with the nut 93.

Upon insertion of the tip 88 into the active part 82 of the second output sleeve 30 the tip 88 will push against the finger 80 of the plunger 78 thus pushing the plunger inwards (to the left in FIG. 2), which causes the rod part 56 to move inwards too as heretofore described. When the front end of the finger 80 is flush with the inner edge of the active part 82 of the second output sleeve 30 features of the output sleeve 30 and plunger 78 cooperate to restrict further inward axial movement of the plunger 78 relative to the output sleeve 30. At this point the ribs 71 of the rod part 56 have been moved inwards (to the left in FIG. 2) but are still in meshed engagement with the inwardly extending teeth 72 of the sleeve 41. Upon further pushing the shear wrench tool 10 onto the bolt 90 the output sleeve 30 is urged inwards against bias of the spring 37, which causes the rod part 56 to move further inwards as heretofore described. At this point the ribs 71 of the rod part 56 have been moved further inwards (to the left in FIG. 2) out of meshed engagement with the inwardly extending teeth 72 of the sleeve 41, disabling the ejection mechanism 50. The nut 93 is received by the first output sleeve 28 (not shown in FIG. 5) and mates with the inner surface profile of its active part 92.

Figure 6:
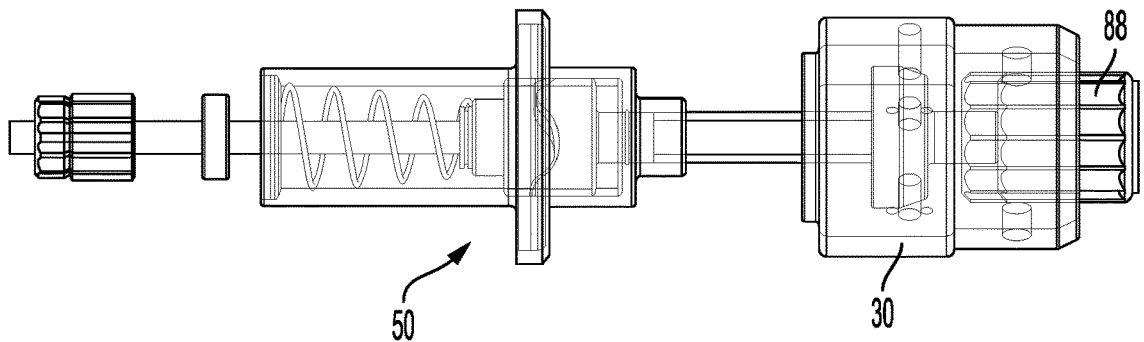

Actuating the trigger mechanism 32 activates the motor 20 and causes the first and second output sleeves 28, 30 (and thus the tip 88 of the bolt 90 and the nut 93) to be rotated relative to each other. The nut 93 is thus tightened onto the bolt 90, wherein at a predetermined torque the tip 88 shears from the bolt 90. A user will subsequently release the trigger 32 for deactivating the electric motor 20 and will withdraw the shear wrench tool 10 from the work area, although the sheared tip 88 remains inside the second output sleeve 30 and is restricted from removal due to friction (see FIG. 6). Upon withdrawing the shear wrench tool 10 from the fastened bolt the inwards force exerted by the bolt against the second output sleeve 30 will be removed, thereby enabling the spring 37 to push the second output sleeve 30 back to its initial position (to the right in FIG. 2), whereby the ribs 71 of the rod part 56 are re-brought into meshed engagement with the inwardly extending teeth 72 of the sleeve 41 thus re-enabling the ejection mechanism 50.

Figure 7:
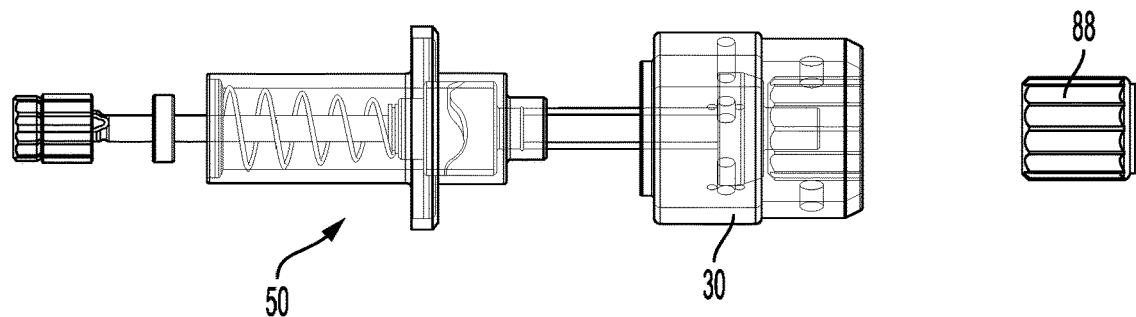

Activating the trigger 32 again and thereby re-activating the motor 20 will drive the ejection mechanism 50 and cause the plunger 78 of the second impact part 62 to repeatedly beat against the sheared tip 88, thereby urging it out of the second output sleeve 30 (due to the first impact part 54 repeatedly beating against the second impact part 62 in the manner heretofore described). In doing so the spring 70 pushes the second impact part 62, via the first impact part 54, against the inner end surface 73 of the cylinder 52 whereby the finger 80 of the plunger 78 once again extends into the space encompassed by the active part 82 of the second output sleeve 30 as illustrated in FIG. 7.

Figure 8:
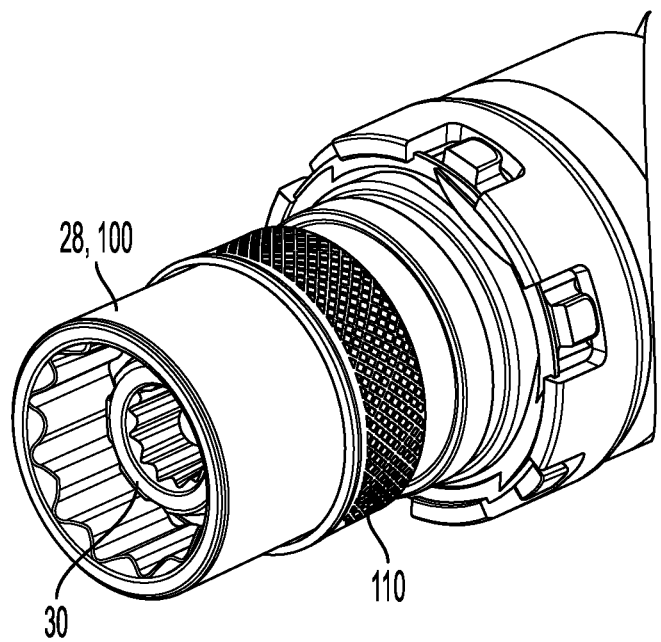
FIG. 8 is a perspective view of the output section of the shear wrench tool in FIG. 1.

The shear wrench tool 10 is provided with a replaceable first output sleeve 28. In the industry the configuration of the tip 88 of bolts 90 is standardised, whereas parameters of bolts 90 and their associated nuts can vary such as thickness, length, thread profile. To accommodate this and enable the shear wrench tool 10 to be used with different types of bolts the first output sleeve 28 can be replaced with an output sleeve that is specifically configured to mate with a particular nut. FIG. 8 illustrates a perspective view of the output section 26 of the shear wrench tool 10. With additional reference to FIGS. 9 to 14 a sleeve assembly will now be described.

An output sleeve 100, which comprises the first output sleeve 28 in FIG. 2, is configured to mate with a nut 93 to facilitate winding of the nut 93 onto a threaded bolt 90. As already mentioned, an active part 92 of such sleeve has a shape configured to cooperate with and receive the nut 93. Additionally, the output sleeve 100 has a plurality of evenly circumferentially distributed projections 102 (see FIG. 11) for interlocking with those of a transmission sleeve 104.

Figure 9:
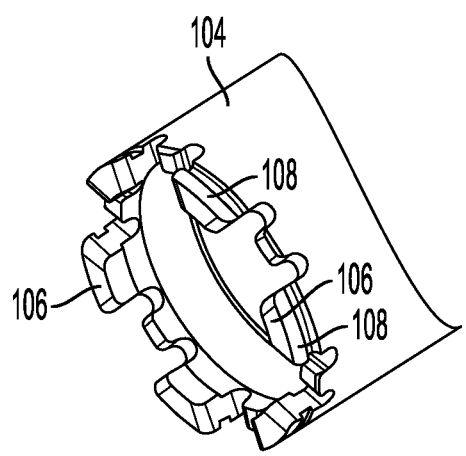
FIG. 9 is a perspective view of part of a transmission sleeve.
Figure 10:
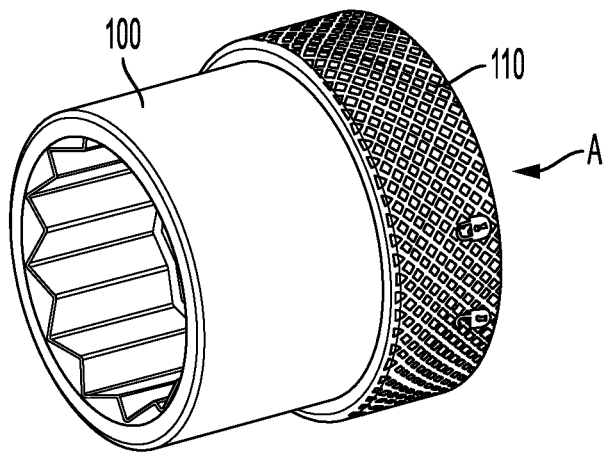
FIG. 10 is a perspective view of an output sleeve and a locking sleeve.

A transmission sleeve 104 illustrated in FIG. 9 is provided for transferring torque between the output sleeve 102 and the shear wrench tool transmission section, wherein the transmission sleeve can be integrally formed with the aforementioned sleeve 53 (see FIG. 2) or rotationally fixed thereto. The transmission sleeve 104 has a set of evenly circumferentially distributed fingers 106 for interlocking with the projections 102 of the output sleeve 100. In particular, looking at FIG. 11, the fingers 106 are received in grooves 103 between the projections 102 of the output sleeve 100 when the fingers 106 interlock with the projections 102. Each finger 106 is provided with an outwardly radially extending ridge 108 for cooperating with a locking sleeve 110.

A locking sleeve 110 is coupled to the output sleeve 100 in a manner which permits the locking sleeve 110 to rotate between first and second rotational positions relative to the output sleeve 100. Looking at FIGS. 12 and 13, the locking sleeve 110 has three evenly circumferentially distributed radially inwardly projecting ridges 112 which are located behind a circlip 114, wherein the circlip 114 is fixed to the output sleeve 100 by being located in a circumferentially extending groove 116 (see FIG. 11). The circlip 114 prevents separation of the locking sleeve 110 and output sleeve 100 along an axial direction but enables such sleeves to be rotated relative to each other.

The locking sleeve 110 also has evenly circumferentially distributed radially inwardly extending locking projections 118, ideally the same number as there are ridges 108 on the transmission sleeve 104, thus in this example eight. The size and space between respective locking projections 118 must be such as to enable them to cooperate with the ridges 108 on the transmission sleeve 104 to resist axial separation of the locking sleeve 110 from the transmission sleeve 104. In particular when the fingers 106 of the transmission sleeve 104 are caused to interlock with the projections 102 of the output sleeve 100 the projections 118 of the locking sleeve 110 are caused to move passed the ridges 108 on the transmission sleeve 104 via the spaces between such ridges 108. Subsequently, when the fingers 106 of the transmission sleeve 104 have interlocked with the projections 102 of the output sleeve 100 the locking sleeve 110 is rotated relative to the output sleeve 100 such that the projections 118 of the locking sleeve 110 are caused to move behind the ridges 108 on the transmission sleeve 104, whereby the ridges 108 and projections 118 cooperate to resist axial separation of the locking sleeve 110 from the transmission sleeve 104—and thereby resist axial separation of the output sleeve 100 from the transmission sleeve 104 in view of the connection between the locking sleeve 110 and the output sleeve 100 described in connection with FIG. 13.

Features of the output sleeve 100 engage with features of the locking sleeve 110 to block over turning of the locking sleeve 110, in order to prevent a situation in which a user turns the locking sleeve 110 like in the above paragraph but the projections 118 are moved passed and subsequently out of alignment with the ridges 108. Looking at FIG. 11 three stumps 120 are evenly circumferentially distributed around the output sleeve 100, wherein these stumps 120 are received in channels 122 of the locking sleeve 110 defined between respective inwardly projecting ridges 112. During a connection operation, as a user turns the locking sleeve 110 eventually an edge of each inwardly projecting ridge 112 will abut against a respective stump 120 when the locking sleeve 110 has been rotated relative to the output sleeve 100 by an amount sufficient to move the locking projections 118 of the locking sleeve 110 behind the ridges 108 on the transmission sleeve 104 in the manner heretofore described.

When the shear wrench tool 10 is in use torque is transferred between the output sleeve 100 (denoted 28 in FIG. 2) and the transmission sleeve 104 (denoted 53 in FIG. 2) via the interlocked features thereof, namely the fingers 106 and projections 102. Rotation between the output sleeve 100 and locking sleeve 110 is prevented because in use the output sleeve 100 is caused to rotate in a direction which further urges the stumps 102 on the output sleeve 100 against the edges of the inwardly projecting ridges 112 on the locking sleeve 110. In other words when the shear wrench tool 10 is in use the output sleeve 100 is driven to rotate in a direction which is contrary to an unlocking direction. In order to remove the output sleeve 100 from the shear wrench tool 10 a user must twist the locking sleeve 110 in a direction which moves the inwardly projecting ridges 112 away from the stumps 102 whereby the projections 118 of the locking sleeve 110 are caused to move from behind the ridges 108 on the transmission sleeve 104. Subsequently, now with the projections 118 of the locking sleeve 110 out of alignment with the ridges 108 on the transmission sleeve 104 the user may simply pull the output sleeve 100 (and locking sleeve 110 coupled thereto) out of engagement with the transmission sleeve 104 and away from the shear wrench tool 100.

Figures 11, 12:
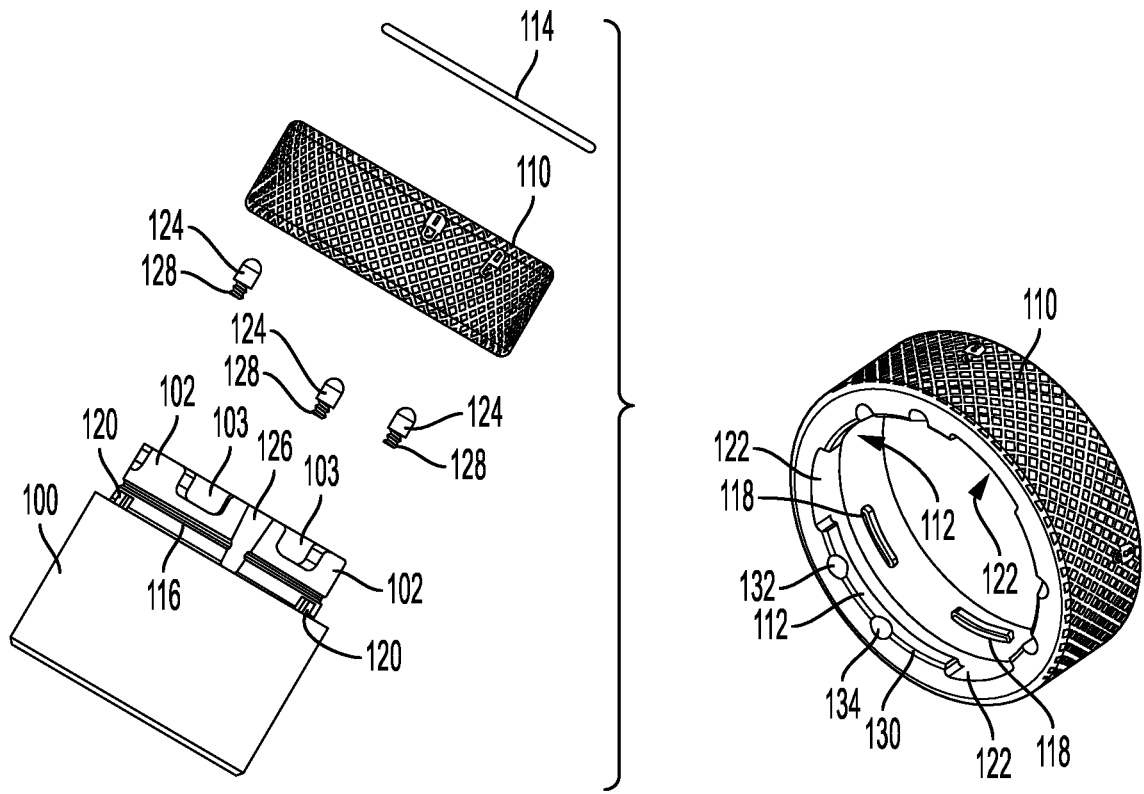
FIG. 11 is an exploded view of the arrangement in FIG. 10.
FIG. 12 is a perspective view of a locking sleeve.
Figure 13:
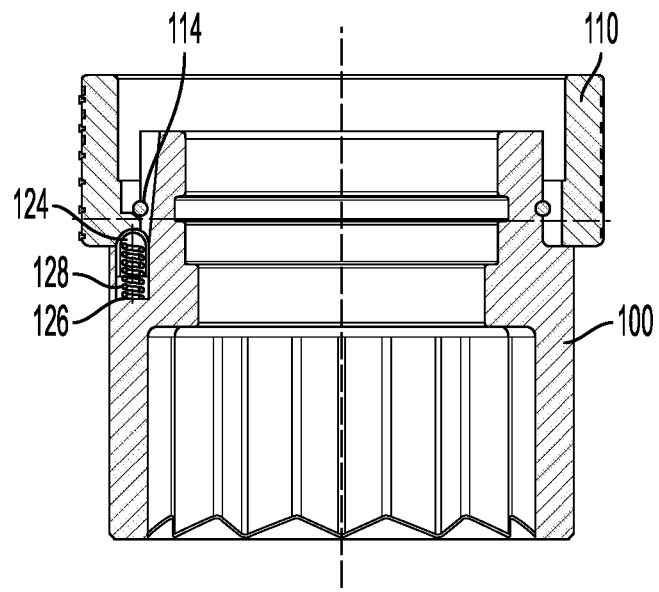
FIG. 13 is a cross-sectional view of the arrangement in FIG. 10.
Figure 14:
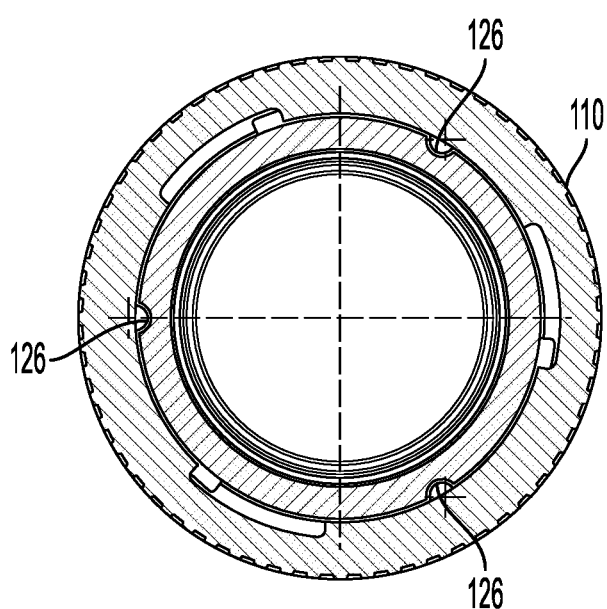
FIG. 14 is a front view of the arrangement in FIG. 10 along the direction denoted A.

A retention mechanism may be provided for holding the sleeve assembly in place after attaching an output sleeve 100 (denoted 28 in FIG. 2) to a shear wrench tool 10 but prior to use of the shear wrench tool 100. Three toes 124, each having a semi-spherical head, are provided between the output sleeve 100 and the locking sleeve 110. The toes 124 are received in respective channels 126 around the output sleeve 100 as shown in FIGS. 11 and 14. A spring 128 is provided behind each toe 124 for urging the toe into engagement with the locking sleeve 100 (see FIG. 13).

Each toe 124 is pushed against an edge 130 of a respective inwardly projecting ridge 112 on the locking sleeve 110, wherein each such edge 130 defines a pair of depressions 132, 134 (see FIG. 12). When the locking sleeve 110 is in a locking state (having been rotated in a locking direction for aligning the aforementioned projections 118 and ridges 108 and abutting the aforementioned stumps 120 and the edges of ridges 112) the toes 124 clip into a first depression 132 of each respective edge 130. When the locking sleeve 110 is in an unlocked state (having been rotated in an unlocking direction for moving the projections 118 and ridges 108 out of alignment with each other and moving the edges of ridges 112 away from the stumps 120) the toes 124 clip into a second depression 132 of each respective edge 130. The inter-engagement between the toes 124 and the depressions 132, 134 is sufficient to restrict rotation of the locking sleeve 110 to some extent, for preventing its unintended rotation, while enabling a user to rotate the locking sleeve 110 by overcoming the retaining force of the toes 124 (specifically by overcoming the force exerted by the springs 128 on the toes 124).

It will thus be apparent from the foregoing how an appropriate output sleeve 28 can be selectively attached to the shear wrench tool 10 depending on the specific type of nut 93 to be coupled to a threaded bolt 90.

It will be appreciated that whilst various aspects and embodiments have heretofore been described, the scope of the present invention is not limited thereto and instead extends to encompass all methods and arrangements, and modifications and alterations thereto, which fall within the spirit and scope of the appended claims.

In some embodiments the cooperating surfaces of the first and second impact parts 54, 62 do not need to be circumferentially extending undulating surfaces. Such surfaces could instead define multiple linear ramps and essentially be a kind of zig-zag shape. Such ramps riding over each other produces the same effect of launching the first impact part 54 away from the second impact part 62.

In some embodiments the cooperating surfaces of the first and second impact parts 54, 62 could each comprise a single circumferentially extending ramp, wherein as such surfaces ride over each other when they reach the end of the circumferentially extending ramps thereof this produces the same effect of launching the first impact part 54 away from the second impact part 62.

In some embodiments the cooperating surfaces of the first and second impact parts 54, 62 do not need to be identical and could have different shapes provided that essentially the same effect is achieved of causing the first impact part 54 to repeatedly beat against the second impact part 62 on activation of the motor 20.

In some embodiments the spring 70 for urging the first impact part 54 to the right in FIG. 2 need not be provided within the cylinder 52. Instead the spring 70 could be located behind the impact part 54 (to the left of the impact part 54 in FIG. 2), wherein a left-side of the spring engages a feature of the motor output shaft 22 and the right-side of the spring engages the impact part 54 for urging the impact part 54 towards the output section 26 (to the right in FIG. 2). In such an alternative embodiment the biasing force against the impact part 54 need not necessarily be provided by a spring but could be provided by an elastically deformable body of material selectable depending on requirements of the tool 10.

In some embodiments the transmission can have fewer or more than five planetary gear stages as heretofore described.

The specific arrangement of gears heretofore described can differ provided that the motor 20, transmission 24 and output sleeves 28, 30 remain coaxial. Various possible arrangements will be apparent to persons skilled in the art in view of the disclosure of this specification. For example instead of having sleeve 41 between the first and second planetary gear stages 40, 42 instead the planet carrier $40_C$ can have a distal end which functions as the sun gear $42_S$ to the second planetary gear stage 42; wherein an inner surface of the planet carrier $40_C$ will thus need to be provided with circumferentially arranged axially extending teeth 72 for rotationally driving the first impact part 54. Similarly the sleeve 47 could be omitted in favour of an extended version of the planet carrier $42_C$ functioning as sun gear $44_S$; wherein an inner surface thereof could also be adapted to include teeth 72 for driving the first impact part 54.

In some embodiments the motor 20 need not necessarily be a brushless motor and therefore instead could comprise a brushed motor.

In some embodiments the plunger 78 could form an integral part of the rod 64.

A ridge 108 need not necessarily be provided on each of the fingers 106 in FIG. 9.

The number of projections 118 on the locking sleeve (see FIG. 12) need not necessarily be equal to the number of ridges 108 on the transmission sleeve 104 but the number of ridges 108 must be higher than the number of projections 118.

In an alternative embodiment the stumps 120 may be arranged on the locking sleeve 110, wherein the ridges 112 are instead provided on the output sleeve 100. In this embodiment the depressions 132, 134 would be on the output sleeve 100 meaning that the toes 124 extend from channels 126 provided on the locking sleeve 110.

The toes 124 can have a different shape and can be spherical for example.

The springs 128 can be replaced with other suitable biasing means.

The invention claimed is:

1. A shear wrench tool comprising:
   an electric motor, an output section having first and second output sleeves and a transmission for transferring torque from the motor to the output section wherein in use the output sleeves are caused to be rotated in opposite directions relative to each another, the first output sleeve configured for mating with a nut and the second output sleeve configured for mating with a tip of a bolt to be sheared;
   the shear wrench tool further comprising an ejection mechanism having a first impact part which is both rotationally and axially movable and which has a first active surface, a second impact part which is rotationally restricted but axially movable and which has a second active surface, the ejection mechanism also having biasing means for urging the first active surface into engagement with the second active surface, wherein in use the first impact part receives torque from the electric motor for causing the first impact part to rotate relative to the second impact part whereby during such rotation interaction between the first and second active surfaces causes the first impact part to disengage from the second impact part against force of the biasing means whereby the biasing means subsequently urges the first impact part back into engagement with the second impact part for generating an impulse which is transferred via the second impact part to a sheared bolt tip for urging the sheared bolt tip out of the second output sleeve.

2. The shear wrench tool of claim 1, wherein the first and second active surfaces each define at least one ramp section.

3. The shear wrench tool of claim 1, wherein at least one of the first and second active surfaces comprises an undulating surface.

4. The shear wrench tool of claim 1, wherein the first active surface comprises a circumferentially extending undulating surface and the second active surface also comprises a circumferentially extending undulating surface.

5. The shear wrench tool of claim 1, wherein at least one of the first and second active surfaces comprises a multi-ramp surface.

6. The shear wrench tool of claim 5, wherein at least one of the first and second active surfaces comprises a toothed like, optionally a zig-zag like, surface.

7. The shear wrench tool of claim 1, wherein at least one of the first and second active surfaces comprises a circumferentially extending slope.

8. The shear wrench tool of claim 1, wherein the biasing means comprises a spring.

9. The shear wrench tool of claim 1, wherein the transmission comprises a plurality of planetary gear stages and the first impact part is arranged to receive torque from a feature of a said planetary gear stage.

10. The shear wrench tool of claim 9, wherein the first impact part is arranged to receive torque from a feature acting as a sun gear of a said planetary gear stage.

11. The shear wrench tool of claim 10, wherein ribs on the first impact part mesh with ribs on an internal surface of said feature acting as a sun gear.

* * * * *